United States Patent [19]

Baccou et al.

[11] Patent Number: 5,085,994
[45] Date of Patent: Feb. 4, 1992

[54] PROCESS FOR THE ACCELERATED AGEING AND TREATMENT OF IRIS RHIZOMES

[75] Inventors: Jean-Claude Baccou, Montpellier; Jean-Marie Bessiere, St. Clement; Patrick Boisseau, Provence; Pierre Faugeras, Pour St. Espris; Nicholas Jouy, Juvignac; Elysabette Peyrot, Saint Cyr Au Mo; Yves Sauvaire, Montferrier Sur, all of France

[73] Assignees: Commissariat A L'Energie Atomique; Universite des Sciences et Techniques Du Languedoc, both of France

[21] Appl. No.: 604,572

[22] Filed: Oct. 26, 1990

[30] Foreign Application Priority Data

Oct. 26, 1989 [FR] France ............................... 89 14042

[51] Int. Cl.$^5$ .......................... C12P 7/26; C12N 13/00
[52] U.S. Cl. ...................................... 435/148; 435/173
[58] Field of Search ................................ 435/148, 173

[56] References Cited

U.S. PATENT DOCUMENTS 1,835,888 12/1931 McCoy .
4,963,480 10/1990 Belcour et al. .................... 435/148

FOREIGN PATENT DOCUMENTS 1185258 7/1959 France .
  75570 6/1961 France .
1212118 11/1970 United Kingdom .

OTHER PUBLICATIONS

Horticultural Abstracts, vol. 17, No. 2, 1985.
Chem. Abs. 99:35930z Kirk et al. "2, Naturforsch C. Biosci" 1983 35C(33-4), 179-184 (Eng.).

Primary Examiner—Herbert J. Lilling
Attorney, Agent, or Firm—Michael N. Meller

[57] ABSTRACT

The invention relates to a process for the accelerated ageing of iris rhizomes consisting of irradiating after harvesting, all or part of the rhizomes with ionizing radiation with a view to accelerating the transformation of triterpenoids of the rhizomes into irones. After leaving them for several days, the irones produced are extracted and are ready for use, particularly in perfumes.

14 Claims, 1 Drawing Sheet

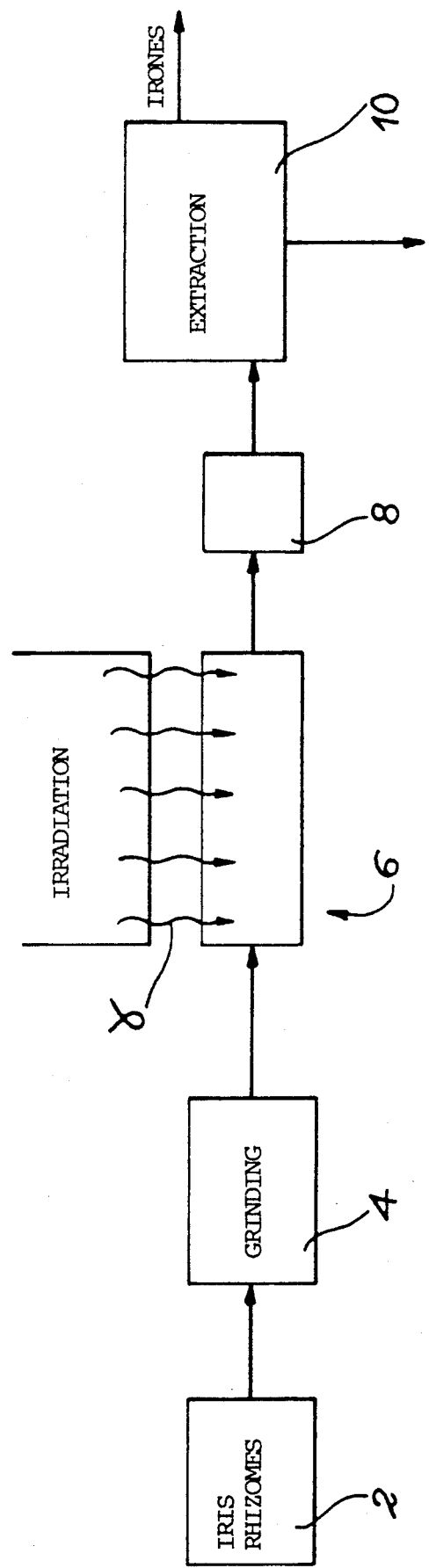

PROCESS FOR THE ACCELERATED AGEING AND TREATMENT OF IRIS RHIZOMES

The present invention relates to a process for the accelerated ageing of iris rhizomes or any other plant containing precursors of irones and a process for the treatment of these prematurely aged rhizomes.

During the ageing of iris rhizomes, the triterpenoids or triterpenes contained in the rhizomes are transformed into irones (generic name given to two diethylene ketones $C_{14}H_{22}O$). The gamma-irone, which is the odorous principle of the iris root, is industrially used in the perfume and cosmetics fields, as well as as a flavor in the agroalimentary field.

At present, following a 2 to 3 year cultivation period of the irises the rhizomes are stored for 3 to 5 years and during said storage, the transformation of the triterpenoids into irones takes place. However, this long iris rhizome storage period levels to a certain number of disadvantages and, more particularly, to the immobilization for several years of the raw material and therefore capital, which can be prejudicial to a good financial administration of the enterprise holding said raw material. In addition, said immobilization leads to an increase in the raw material costs, when said material is stored by the iris producer, or in the industrial treatment process costs, when the rhizomes are stored by the manufacturers of perfumes, cosmetics or food flavors.

In addition, the marketing of iris rhizomes which have not been stored for a sufficiently long period of time to ensure an optimum transformation of the triterpenoids into irones can lead to mediocre yields during the industrial treatment, thereby further increasing the costs of the end products. The above disadvantages exist for all plants, the rhizomes of which contain compounds which can be transformed into irones.

The present invention relates to a process for the accelerated ageing of iris rhizomes or any other plant containing precursors of irones, as well as to a process for treating these rhizomes making it possible to obviate the aforementioned disadvantages by speeding up the transformation of the precursors and, in particular, triterpenoids into irones, thereby limiting the immobilization of capital and the industrial treatment costs of the rhizomes for extracting therefrom the products which can be used in the perfume, cosmetic and food sectors.

More specifically, the present invention relates to a process for the accelerated ageing of a rhizome of the iris or any other plant material containing precursors of irones and consisting of irradiating, following harvesting or collecting, all or part of the rhizome using ionizing radiation with a view to accelerating the transformation of said precursors of the rhizome or material into irones. In the case of irises, the precursors are essentially triterpenoids.

Irradiation of seeds or rhizomes of flowers has only been used up to now for improving the appearance of the flowers, the robustness or growth of the plants by mutation, as described in Horticultural Abstracts, vol. 17, No. 2, 1985 "Induction of mutations in iris (Iris Kumaonensis) through gamma rays and the chemical mutagen-ethyl methane sulphonate", GB-A-1 212 118 or FR-A-1 185 258. This irradiation is carried out before or after placing in the ground and at weak, non-destructive doses.

According to the invention, the irradiation of all or part of the iris rhizomes by ionizing radiation produces free radicals from the water molecules present in the rhizomes increasing the oxidation rate of the precursors and, in particular, the triterpenoids into irones.

Preferably, the rhizomes are treated by the inventive process as soon as they are harvested. Thus, fresh rhizomes contain a large amount of water which, under irradiation, will produce a large amount of free radicals used for the oxidation of precursors such as triterpenoids. However, in certain cases, it is possible to irradiate all or part of the iris rhizome following a predetermined storage period. In particular, it is possible to treat rhizomes already being stored by iris producers or industrial enterprises.

This irradiation also permits an optimum transformation of the precursors and in particular the triterpenoids into irones, thus increasing the production yields for the end products.

According to the invention, the ageing process can be applied to the whole or part of the iris rhizome, to rhizomes ground into the form of a coarse powder or to the precursors of irones such as the triterpenoids extracted from the rhizomes.

According to the invention, the triterpenoids are extracted from the iris rhizomes with the aid of organic solvents. This extraction, in particular, takes place by contacting an alkane and a in particular, hexane solution with the iris rhizomes, followed by the addition of an equal volume of an alcoholic solution miscible with the alkane solution and, in particular, a 70% ethanol solution.

The solution obtained then directly undergoes irradiation, which will out the water molecules from said solution and form free radicals to be used for the oxidation of the triterpenoids.

In order to obtain an interesting positive effect, irradiation doses between 0.5 and 100 kgrays are used. A dose of 0.5 kgray leads to an excessively slow oxidation rate, whereas a dose above 100 kgrays can lead to a partial deterioration of the molecules constituting the rhizomes and which is prejudicial to the production of irones.

Advantageously, use is made of dosage rates between 3 and 100 grays/minute. The use of low dosage rates makes it possible to extend the irradiation period, which is preferable for a maximum transformation of the precursors, such as triterpenoids, into irones. During tests the irradiation time varied between 20 minutes and 165 hours.

According to the invention, irradiation is carried out with ionizing rays, i.e., very high energy rays such as accelerated electrons or X-, or gamma rays. In particular, irradiation is carried out with gamma rays or accelerated electrons.

Advantageously, the irradiation of the vegetable material is effected after having put it into a tight container.

The invention is applicable to all known iris rhizomes and, in particular, to the two species most commonly used in industry, namely, *Iris germanica* L. and *Iris pallida* L.

The invention also relates to a process for the treatment of an iris rhizome consisting of subjecting it to the ageing process described hereinbefore, leaving it for a period variable as a function of the irradiation conditions and then extracting therefrom the thus obtained irones. The period during which the rhizomes are left in the open air is necessary in order to ensure the optimum transformation of triterpenoids into irones. This period corresponds to an incubation period.

In particular, the process according to the invention makes it possible to obtain in two months a content of irones in iris rhizomes which have just been harvested, which is comparable to that of rhizomes stored for a minimum of three years.

Extraction of the irones can take place in conventional manner by hydrodistillation or with the aid of organic solvents, such as aliphatic or aromatic alkanes and their chlorinated derivatives. It is possible, for example, to use hexane, dichloromethane, benzene, etc..

Other features and advantages of the invention can be gathered from the following description given in an illustrative and non-limitative manner, with reference to the single drawing, which diagrammatically shows the different stages of the iris rhizome treatment process according to the invention.

Just after the harvesting of the iris rhizomes, represented by block 2 in the drawing, they are ground so as to form a coarse powder with a grain size diameter of approximately 1 mm. This grinding stage is represented by block 4 in the drawing. This powder is then irradiated, the dosage rate being 3 to 100 grays/min and whereof the dose is 3 to 30 kgrays, using gamma radiation emitted by cesium $^{137}$ or any other source. This irradiation stage is represented by 6 in the attached drawing and ensures the transformation of the water molecules of the rhizome powder into free radicals.

The irradiated powder is then stored for 1 to 2 months in the open air to enable the free radicals to react with the triterpenoids and oxidize the latter into irones. This stage is represented by 8 in the drawing. The powder is then treated so as to extract the irones therefrom.

This extraction stage, represented by block 10 in the drawing, consists of known hydrodistillation.

The thus extracted irones can be directly used in perfumes and cosmetics as an odorous product and as a flavors in foods.

This treatment process has been applied to *Iris germanica* L. and *Iris pallida* L.

In parallel to the process according to the invention, ground iris rhizomes were stored in the open air for three years.

The determination of the content of irones in the powder treated according to the invention and in that treated according to the prior art was carried out by gas chromatography. The results obtained appear in the following table. The content of irones therein is given in gram/gram of dry powder.

TABLE

| CONTENT OF IRONES IN IRIS RHIZOMES | | | |
|---|---|---|---|
| Irradiation | 0 Initial content T = 0 | 0 treatment 1 T = 2 months | 3 kgr treatment 2 T = 2 months |
| IRIS GERMANICA L. | $0.81 \times 10^{-4}$ | $1.01 \times 10^{-4}$ | $1.57 \times 10^{-4}$ |
| IRIS PALLIDA L. | $0.387 \times 10^{-4}$ | $2.7 \times 10^{-4}$ | $3.62 \times 10^{-4}$ |

Treatment 1 corresponds to powder stored in the open air and treatment 2 to powders irradiated at 3 kgrays and then stored in the open air for 2 months according to the invention.

The table clearly shows that the irradiated iris rhizome powder according to the invention contains, after 2 months storage, a larger quantity of irones than the same non-irradiated powder.

In addition, the determinations carried out on the basis of *Iris pallida* L. stored for 4 years and not irradiated gave a content of irones of $3.67 \times 10^{-1}$ g/g of dry powder, which is very close to the value obtained using gamma irradiation.

Moreover, it was found that the rhizome stored in the open air for several years had been in part attacked by fungi, whereas the rhizomes treated according to the invention were free from said cryptogamic attack.

In addition, the treatment procedure of the invention was used on the powder of *Iris pallida* L. rhizomes stored for several years by industrial enterprises. Prior to the treatment according to the invention, said powder contained $3.27 \times 10^{-4}$ g of irones/g of dry powder. After treatment, the same powder contained $7.13 \times 10^{-4}$ g of irones/g of dry powder, which corresponds to a doubling of the content of irones. However, this is not to be considered as an optimum content.

Advantageously, the irradiation is effected after having put the vegetable material to be irradiated in tight containers or bags and the irradiated material is then stored in these bags until the extraction of the irones. In these conditions, it is possible to obtain an irone gain of 20%.

We claim:

1. Process for prematurely ageing at least one part of a plant material containing triterpenoids precursors of irones consisting of irradiating after harvesting said part of the plant material with ionizing radiation at a dosage rate from 0.5 to 100 grays/minute for transforming said plant material precursors into irones.

2. Process according to claim 1, wherein said radiation is applied to at least one part of an iris rhizome.

3. Process according to claim 1, wherein said plant material is a powder of an iris rhizome.

4. Process according to claim 1, wherein said precursors are extracted from an iris rhizome and are subjected to said radiation.

5. Process according to claim 1, wherein the irradiation is effected at a dose from 0.5 to 100 kgrays.

6. Process according to claim 1, wherein the ionizing radiation consists of a radiation selected in the group from accelerated electron and gamma radiation.

7. Process according to claim 2, wherein the irradiation is performed as soon as the rhizome is harvested.

8. Process according to claim 2, wherein the rhizome is selected in the group from the *iris germanica* L, and *iris pallida* L rhizome.

9. Process according to claim 2, wherein said rhizome is treated after being stored for a certain number of months or years.

10. Process according to claim 3, wherein said powder is treated after being stored for a certain number of months or years.

11. Process according to claim 1, wherein the irradiation is effected after having put said plant material part to be irradiated in a tight container.

12. Process for treating at least one part of plant material containing triterpenoids precursors of irones, consisting of subjecting said plant material to an irradiation after harvesting with ionizing radiation at a dosage rate from 0.5 to 100 grays/minute for transforming said plant material precursors into irones, said irradiation of said material part being effected in a tight container, and storing said irradiated part in said container until the extracting of the thus obtained irones.

13. Process for treating an iris rhizome containing triterpenoids precursors of irones consisting of irradiating after harvesting, said iris rhizome with ionizing radiation at a dosage rate from 0.5 to 100 grays/minute for transforming said precursors into irones, leaving said irradiated rhizome for 15 to 60 days and then extracting the thus obtained irones.

14. Process for treating an iris rhizome containing triterpenoids precursors of irones, consisting of grinding said rhizome in order to obtain a powder and irradiating said powder with ionizing radiation at a dosage rate from 0.5 to 100 grays/minute for transforming said precursors into irones.

* * * * *